May 3, 1955 O. M. STUETZER 2,707,762

TRANSCONDUCTOR EMPLOYING LINE TYPE FIELD CONTROLLED SEMICONDUCTOR

Original Filed Oct. 6, 1949

INVENTOR.
OTMAR M. STUETZER
BY James S. Shannon
AGENT—
Wade Koontz
ATTORNEY—

United States Patent Office 2,707,762

Patented May 3, 1955

2,707,762

TRANSCONDUCTOR EMPLOYING LINE TYPE FIELD CONTROLLED SEMICONDUCTOR

Otmar M. Stuetzer, Springfield, Ohio

Original application October 6, 1949, Serial No. 119,985, now Patent No. 2,618,690, dated November 18, 1952. Divided and this application May 20, 1952, Serial No. 288,995

6 Claims. (Cl. 317—235)

(Granted under Title 35, U. S. Code (1952), sec. 266)

The invention described herein may be manufactured and used by or for the Government for governmental purposes without payment to me of any royalty thereon.

This application is a division of my application Serial No. 119,985, filed October 6, 1949, now Patent 2,618,690 issued November 18, 1952.

This invention relates to transconductive devices of the type employing a semiconductor as the current controlling element.

In my patent application Serial No. 119,541, filed October 4, 1949, there was described and claimed a transconductive device employing a semi-conductor in which the output electrode made a point contact with the semi-conductor and in which the input or control electrode was positioned very close to the point contact and served to control the electrical field in the neighborhood of the point contact. Variations in control electrode potential, as by a signal voltage, produced corresponding variations in output electrode current. The device had high input impedance, high current and power amplification, and high efficiency. It had circuit impedance values comparable to those of a vacuum tube and within its power limitations could, like a vacuum tube, be used as an amplifier, detector, oscillator, volume controlling device, grid controlled rectifier, etc. The device also exhibited a peculiar characteristic in that the sign of its mutual conductance was a function of the control electrode bias voltage. This characteristic permitted its use as a phase inverter in which a reversal of phase could be produced by shifting the bias from a value at which the mutual conductance was of one sign to a value at which the mutual conductance was of the opposite sign.

The transconductive device described in the present application is similar to that described above in its characteristics and uses but is different in that a line contact, rather than a point contact, is made between the output electrode and the semiconductor, a line contact being defined as a contact area one dimension of which is very large compared to the other. This type construction is easier, particularly for quantity production of the device, and in addition results in smaller interelectrode capacities, higher mechanical and electrical stability and higher power handling capacity.

It is accordingly the object of the invention to provide a transconductive device employing a field controlled semiconductor and having many of the characteristics of a vacuum while not requiring a heated cathode or an evacuated envelope.

It is a further object of the invention to provide a transconductive device of the semiconductor type having a high input impedance, high current and power amplification and high efficiency.

It is a still further object of the invention to provide a transconductive device of the semiconductor type in which a line contact exists between the output electrode and the semiconductor and in which a control electrode is provided for controlling the electrical field in the neighborhood of the line contact.

It is another object of the invention to provide a transconductive device of the semiconductor type the design of which lends itself readily to modern manufacturing techniques such as evaporation, sputtering and electroplating.

It is still another object of the invention to provide a transconductive device of the semiconductor type which has a high degree of mechanical and electrical stability.

It is a further object of the invention to devise suitable processes for manufacturing transconductive devices of the type described.

The specific details of the invention will be explained in connection with the accompanying drawing, in which Fig. 1 is a schematic diagram of a transconductive device employing line contact between the output electrode and the semiconductor;

Figure 1:
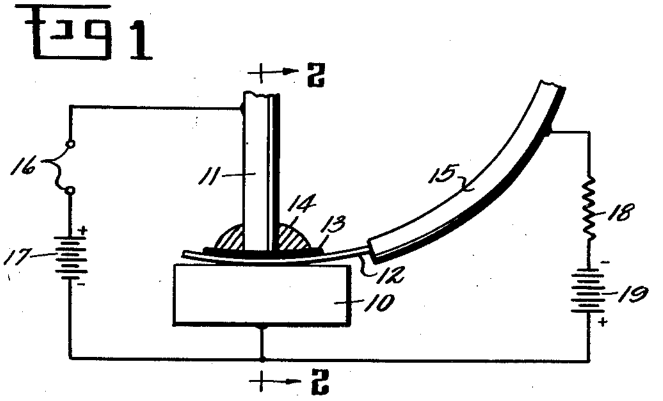
Figure 2:
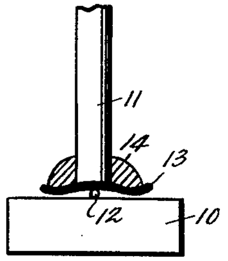
Fig. 2 is a sectional view of Fig. 1.

Referring to Figs. 1 and 2 a transconductive device in accordance with the invention is shown and comprises a semiconductor 10, a control electrode 11 and an output electrode 12. The output electrode 12 consists of a very fine wire which is pressed against the semiconductor 10 by the control electrode 11. The control electrode is insulated from the wire 12 by a sheet of insulating material 13 which should be as thin as possible. A drop of colloidal silver 14 is deposited on the insulating sheet and around the end of the control electrode to distribute the electrical potential of the control electrode over the insulating member. As semiconductor material n-type and p-type germanium, p-type silicon and tellurium are recommended. The n-type and p-type designation is in accordance with the present theory of conduction in semiconductors, the former representing conduction by free electrons and the latter representing conduction by "holes" due to absences of electrons in the interatomic bonds. The output electrode 12 is shown in Fig. 1 as the core of a piece of Wollaston wire. Wollaston wire is made up of a very fire wire of relatively hard metal such as platinum as the core and an outer sheath 15 of a relatively shoft metal such as silver which protects the fine core wire and adds sufficient strength and size to make the composite strand easy to handle. The core may have a diameter of from 2½ to 5 microns and is exposed by eating away the outer layer of silver with a suitable acid usually supplied by the manufacturer of the wire. While Wollaston wire is well suited for use as the output electrode, fine wires of other metals such as tungsten may also be employed. The insulating sheet 13 may be made of any suitable thin insulating material such as thin glass, paper or plastic material such as cellophane. The control electrode should have a flat end surface of greater dimensions than the diameter of the wire forming the output electrode.

An input circuit, consisting of input terminals 16 and bias voltage source 17, is connected between the control electrode and the semiconductor. An output circuit, consisting of load impedance 18 and direct current source 19, is connected between the output electrode and the semiconductor. Variation of the potential of control electrode 11, as by the application of a signal to terminals 16, results in corresponding variations of current in the output circuit. This is believed to be due to the variation of the electric field in the semiconductor in the neighborhood of the line contact. The polarity of source 19 is normally such as to send current in the high resistance or back direction of the semiconductor. For n-type germanium operation in the back direction requires that the output electrode be negative with respect to the semiconductor as shown in Fig. 1. Operation in the forward direction is also possible and results in low noise and low relaxation effects making such operation advantageous in some high frequency applications. Forward operation is also characterized by greatly reduced power output and output impedance as compared with operation in the back direction. The input impedance of the device is extremely high and comparable to that of a vacuum tube. The device also draws no current from bias source 17 which adds to its efficiency.

Figure 3:
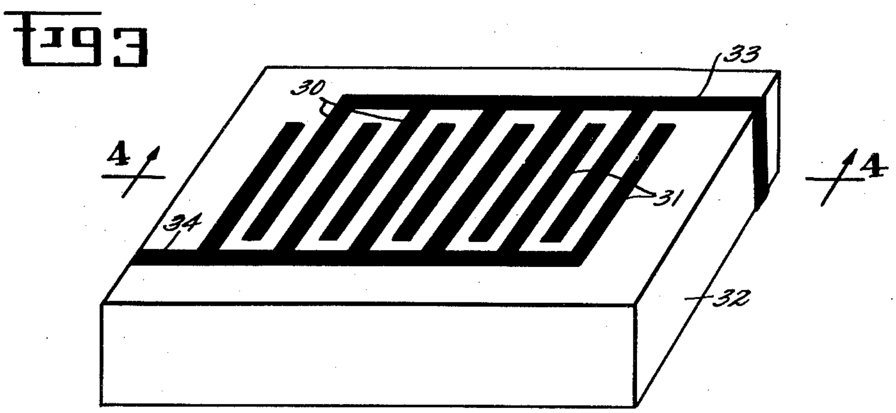
Fig. 3 shows an electrode structure in accordance with the invention.
Figure 4:
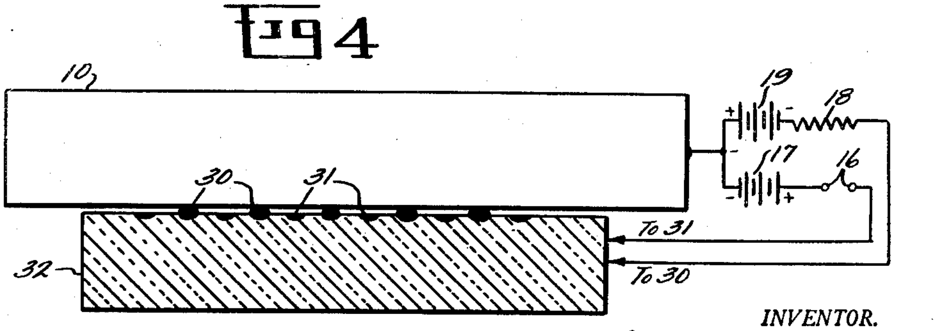
Fig. 4 shows the assembled transconductive device in a suitable circuit.

A different type output and control electrode assembly is shown in Fig. 3. A series of parallel connected metallic output electrodes 30 and a series of parallel connected metallic control electrodes 31, positioned on either side of the output electrodes, are mounted on a piece of insulating material 32. Leads 33 and 34 serve to make electrical connection to the output and control electrodes respectively. The input electrodes 31 are flush with the insulating base 32 but the output electrodes 30 extend slightly above the surface of the base as shown in the sectional view of Fig. 4. When this electrode assembly is pressed against the flat surface of a semiconductor 10, as shown in Fig. 4, the output electrodes 30 make line contacts with the semiconductor but the control electrodes 31 are slightly spaced from the semiconductor so that they do not touch and are able to control the electrical field in the neighborhood of the line contacts between electrodes 30 and the semiconductor. The input electrodes 31 and the output electrodes 30 may be connected in input and output circuits similar to those connected to control electrode 11 and output electrode 12 in Fig. 1. It is evident that the output electrode structure of Fig. 3 provides in effect a number of line contacts in parallel which makes possible higher output current values and higher power output than in the case of a single line contact.

In order to effectively control the electrical field in the semiconductor in the vicinity of the line contact it is necessary that the sizes of the output and control electrodes and their spacings be extremely small. Accordingly, the output electrodes 30 and the control electrodes 31, and also the spacings between these electrodes, are made to be of the order of 1 to 2 microns. In this respect it is pointed out that, for the sake of convenience, Figs. 3 and 4 are not drawn to scale, and that in an actual embodiment of the electrode assembly the block of insulation 32, must necessarily be much greater in size in comparison to the electrodes than indicated in these figures. The electrode assembly may be made by first engraving the grid-like structure on a flat surface of suitable insulating material such as quartz. The engravings should be 1 to 2 microns wide and equally deep. The spacings between the engraved grooves for the control and output electrodes should also be from 1 to 2 microns. Engraving of this character can be accomplished by the use of a dividing machine such as employed in making optical grids. After engraving a metal such as silver or antimony is applied over the entire engraved area by evaporation or sputtering. The surface of the insulator is then ground off to remove all metal except that remaining in the engraved grooves. The assembly is then placed in an electrolytic solution and the output electrodes 30, but not the control electrodes 31, connected in an electroplating circuit. The resulting plated metal on the output electrodes raises them above the surface of the insulator as shown in Fig. 4. A suitable dielectric layer, such as a thin film of oil or glycerine or other material having a high dielectric constant, may be inserted between the electrode assembly and the semiconductor if desired and the presence of such a film has been found to increase the mutual conductance of the device by a factor roughly proportional to the dielectric constant. The output electrodes should, of course, be pressed through the film to contact the semiconductor.

I claim:

1. A transconductive device comprising a semiconductor, an output electrode structure having a plurality of parallelly disposed contacting elements making line contacts with said semiconductor, a control electrode structure comprising a plurality of parallelly disposed control elements positioned close to and parallel to said contacting elements but separated from said contacting elements and said semiconductor by dielectric, means for electrically connecting said contacting elements together and to an external circuit, and means for connecting said control elements together and to an external circuit.

2. Apparatus as claimed in claim 1 in which the dielectric separating said control elements and said semiconductor is a material having a high dielectric constant.

3. A transconductive device comprising a semiconductor having a flat surface, an electrode assembly comprising a base of insulating material having a flat surface, a plurality of extremely narrow metallic strips parallelly disposed and closely spaced on the flat surface of said base of insulating material, means for connecting one group of alternate strips together and to an external circuit, means for connecting the other group of alternate strips together and to an external circuit, one group of alternate strips having their upper surfaces substantially flush with the flat surface of said base and the other group of alternate strips having their upper surfaces in a plane parallel to the flat surface of said base and slightly above the upper surface of said one group of alternate strips, and means for forcing said electrode assembly against said semiconductor with the flat surfaces of each facing whereby the strips of said other group of alternate strips make substantially line contact with the flat surface of said semiconductor and no contact exists between the strips of said one group of alternate strips and said semiconductor.

4. The process of manufacturing an electrode structure for use in a transconductive device of the class described, said process comprising engraving the flat surface of an electrode assembly base of insulating material so as to produce a plurality of closely spaced parallel grooves on said flat surface, engraving grooves interconnecting one group of alternate grooves of said plurality of closely spaced grooves, engraving grooves interconnecting the other group of alternate grooves of said plurality of closely spaces grooves, applying a layer of metal over the engraved area of said flat surface, removing all deposited metal from said flat surface save that remaining in said grooves, and electroplating metal onto the metal remaining in the grooves of one of said groups of alternate grooves in order to elevate the upper surface of the metal in these grooves above that of the metal in the other set of alternate grooves.

5. The method of claim 4 in which the application of metal over the engraved area is by sputtering.

6. The method of claim 4 in which the application of metal over the engraved area is by condensation from a metallic vapor.

References Cited in the file of this patent

UNITED STATES PATENTS

| | | |
|---|---|---|
| 2,561,123 | Kurshan | July 17, 1951 |
| 2,595,052 | Casellini | Apr. 29, 1952 |
| 2,618,690 | Stuetzer | Nov. 18, 1952 |